United States Patent
Gu

(10) Patent No.: US 6,880,622 B1
(45) Date of Patent: Apr. 19, 2005

(54) AIR GUIDE DEVICE FOR COOLING TOWER

(75) Inventor: Jae Byeong Gu, Incheon (KR)

(73) Assignee: Kyung In Machinery Co., Ltd., Incheon (KR)

( * ) Notice: Subject to any disclaimer, the term of this patent is extended or adjusted under 35 U.S.C. 154(b) by 0 days.

(21) Appl. No.: 10/786,252

(22) Filed: Feb. 24, 2004

(30) Foreign Application Priority Data

Dec. 10, 2003 (KR) .............................. 10-2003-0089663

(51) Int. Cl.[7] .............................................. F28F 27/00
(52) U.S. Cl. ...................... 165/96; 165/900; 165/60; 454/227; 62/186
(58) Field of Search .............................. 165/78, 59, 60, 165/98, 900, 99, 96, 48.1, 125; 261/149, DIG. 11; 454/226, 227; 62/186–187

(56) References Cited

U.S. PATENT DOCUMENTS

| | | | | |
|---|---|---|---|---|
| 3,479,799 A | * | 11/1969 | Toyohiko | ..................... 96/286 |
| 3,687,425 A | * | 8/1972 | Katz | ....................... 261/114.1 |
| 3,923,935 A | * | 12/1975 | Cates | .......................... 261/159 |
| 3,933,196 A | * | 1/1976 | Heller et al. | ................. 165/100 |
| 4,434,841 A | * | 3/1984 | Jackson et al. | ............. 165/125 |
| 4,662,902 A | * | 5/1987 | Meyer-Pittroff | ................ 96/53 |
| 4,853,162 A | * | 8/1989 | Liu | ............................. 261/89 |
| 5,112,371 A | * | 5/1992 | Tippmann et al. | ............ 96/328 |

* cited by examiner

*Primary Examiner*—Tho Duong
(74) *Attorney, Agent, or Firm*—Squire, Sanders & Dempsey

(57) ABSTRACT

An air guide for a cooling tower that prevents the air discharged from the cooling tower from flowing back into the cooling tower, and facilitates smooth circulation of outside air inside the cooling tower. The air guide is coupled to a side surface of the cooling tower, and has a length corresponding to a width of the side surface. The air guide includes an air-inflow prevention wall having a curved cross section extending downwardly and outwardly. The air guide further includes an air inlet portion defined at a lower end of the air-inflow prevention wall, and an extension portion extending from the lower end of the air-inflow prevention wall toward the cooling tower.

5 Claims, 5 Drawing Sheets

AIR GUIDE DEVICE FOR COOLING TOWER

PRIORITY REFERENCE TO PRIOR APPLICATION

This application claims benefit under 35 U.S.C. §119 of Korean patent application number 10-2003-0089663, entitled "AIR GUIDE FOR COOLING TOWER," filed on Dec. 10, 2003, by inventor Jae Byeong GU.

BACKGROUND OF THE INVENTION

1. Field of the Invention

The present invention relates generally to an air guide device for a cooling tower so as to control the inflow of air streams into the cooling tower, and more particularly to an air guide for a cooling tower, which prevents the air discharged from the cooling tower from flowing back into the cooling tower and facilitates smooth circulation of the air in the interior space of the cooling tower.

2. Description of the Related Art

As is well known, cooling towers are installed in freezer, heat exchangers, or air conditioning equipments in order to absorb heat from high temperature cooling water used in heat exchange, and to continuously supply with low temperature cooling water.

Typically, a cooling tower is constructed so that outside air introduced into the cooling tower through a cooling fan operatively installed at the upper side of the cooling tower is used for the heat exchange with the flowing cooling water downwardly while passing through the filler material.

Considering a conventional cross-flow type cooling tower, designated as reference numeral 10, as shown in FIG. 1, high temperature cooling water sprayed from an upper water reservoir 14 through nozzles 15 flows in a downward direction along a filler material 13, and then heat-exchanges with outside air introduced by a cooling fan 11. In order to improve cooling efficiency of such cooling tower 10, the substantially dry low temperature air must be introduced into the cooling tower 10, and then must evenly pass through the filler material 13.

There is an essential disadvantage of the conventional cooling tower 10 in that a part of hot and humid air discharged from the cooling fan 11 flows back into the cooling tower 10. That is, a part of air streams discharged through the cooling fan 11 to the outside, occasionally flows back into the cooling tower 10 from rim region thereof, due to various factors including resistivity and gravity of the outside air flowing in the vicinity of the central region of the cooling tower 10, and thus cause deteriorative performances in cooling efficiency of the cooling tower 10.

In general, the air streams introduced into the filler material 13 of the cooling tower 10 by means of the cooling fan 11 have a tendency to flow along a portion exhibiting a lowest resistivity. Therefore, a part of the air streams, especially, flowing in the upper portion of the cooling tower 10, may flow into a space defined between the upper end of the filler material 13 and the lower end of the upper water reservoir 14. Although the space is provided at sides thereof with baffles 16 for preventing the air streams to directly flow thereinto, it cause insufficient heat exchange because of only some quantity of the air streams passed through the filler material 13. Further, due to such an insufficient amount of the inflow air streams on a partial region of the filler material 13, stagnant air streams occur and bring about undesired capability of the cooling tower 10.

Additionally, the conventional cooling tower has in a problem that the end portion of the filler material 13 is exposed to the outside, resulting in a rapid deteriorative performance thereof by ultraviolet-rays, and a damage to the cooling tower 10 by exterior impurities, rainwater, and the like.

SUMMARY OF THE INVENTION

Therefore, the present invention has been made in view of the above problems, and it is an object of the present invention to provide an air guide for a cooling tower, which can prevent the air discharged from a cooling fan from flowing back into the cooling tower, as well as, can secure smooth circulation of the air inside the cooling tower.

It is another object of the present invention to provide an air guide for a cooling tower, which can protect a filler material of the cooling tower from direct sunlight, and can prevent invasion of any exterior impurities, rainwater, and the like into the filler material.

In accordance with the present invention, the above and other objects can be accomplished by the provision of an air guide device for a cooling tower, comprising: at least one air guide coupled to a side surface of the cooling tower, and having a length corresponding to a width of the side surface, wherein the air guide includes: an air-inflow prevention wall having a curved cross section extending downwardly and outwardly, and adapted to prevent air discharged from the cooling tower from flowing back thereinto; and an air inlet portion defined at a lower end of the air-inflow prevention wall and adapted to allow inflow of outside air into the cooling tower.

Preferably, the air guide may further include an extension portion extending from the lower end of the air-inflow prevention wall toward the cooling tower.

Preferably, a plurality of air guides may be arranged in a vertical direction of the cooling tower.

Preferably, the air guides may be reduced downward in width and height.

These and other objects, features and advantages of the present invention will be readily apparent to person of ordinary skill in the art upon reading the entirety of this disclosure, which includes the accompanying drawings and claims.

DETAILED DESCRIPTION OF THE PREFERRED EMBODIMENTS

Figure 3:
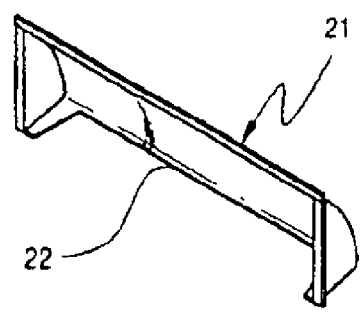
FIG. 3 is a perspective view illustrating an air guide for a cooling tower in accordance with an embodiment of the present invention.
Figure 4:
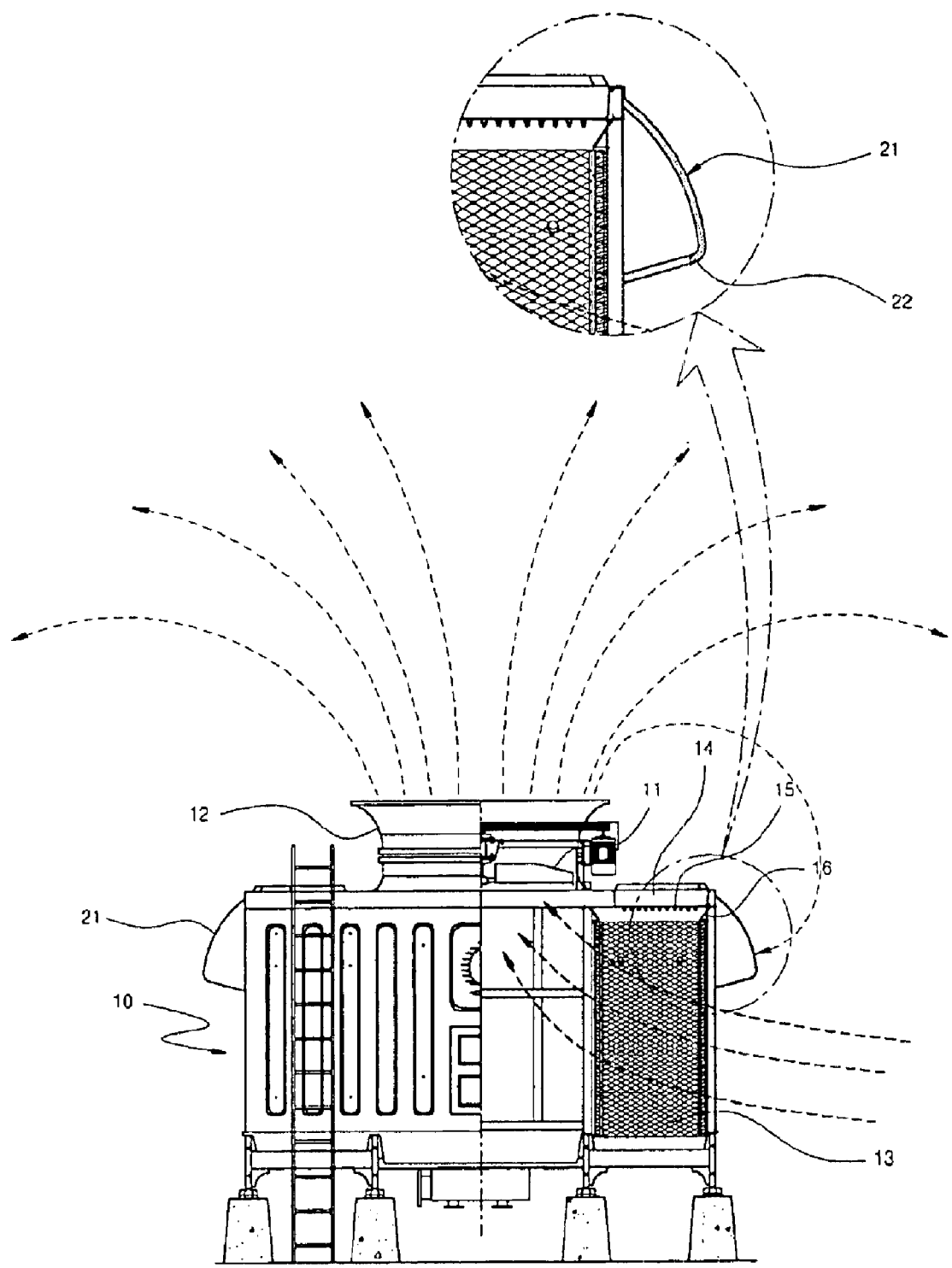
FIG. 4 is a front view illustrating a cooling tower provided with the air guide in accordance with an embodiment of the present invention.

Referring to FIGS. 3 and 4, there are shown an air guide for a cooling tower in accordance with an embodiment of the present invention.

The air guide 21 is made of a board material, and has a curved cross section extending downwardly and outwardly. That is, the air guide 21, viewed from the front of the cooling tower as shown in FIG. 4, has an air-inflow prevention wall for preventing the air discharged from the cooling tower from flowing back into the cooling tower. The air-inflow prevention wall of the air guide 21 is configured so that, in a state wherein the air guide 21 is coupled to a side surface of the cooling tower, it is spaced farther from the cooling tower by a certain width (in the horizontal direction of FIG. 4) as it extends downwardly along a certain height of the cooling tower (in the vertical direction of FIG. 4). The air guide 21 is opened at the bottom thereof for allowing the inflow of the outside air. The air guide 21 has a length equal to or longer than a width of one side surface of the cooling tower 10, through which the side portion of the filler material 13 is exposed. Here, the filler material 13 consists of a plurality of filler material layers stacked inside the cooling tower 10.

The air guide 21 is formed at both ends thereof with barriers for preventing the air from flowing thereinto in lateral directions. The shape of these barriers, that is, the lateral shape of the air guide 21 can be seen from FIG. 4 depicting a front view of the cooling tower 10.

The air guide 21 is coupled at the upper end thereof to an upper frame of the cooling tower 10. In a coupled state of the air guide 21 to the cooling tower 10, the lower end of the air guide 21 is positioned so as to extend outwardly and downwardly from the cooling tower 10.

At the lower end of the air guide 21, more particularly, at the lower ends of the air-inflow interception wall and the lateral barriers is formed an extension portion 22 for the improved control of air streams flowing into the cooling tower 10. The extension portion 22 has a length corresponding to the overall length of the air guide 21, and further has a sufficient width to allow it to extend from the lower end of the air guide 21 toward the cooling tower 10.

The operation of the air guide 21 for a cooling tower in accordance with an embodiment of the present invention will be explained.

When the cooling tower 10 is in operation, high temperature cooling water is sprayed onto the filler material 13 through the nozzles 15, and flows in a downward direction along the filler material 13. In this state, substantially dry low temperature outside air is introduced according to the operation of the cooling fan 11, and is used for the heat exchange with the high temperature cooling water. In this way, the cooling water is collected in the lower portion of the cooling tower 10 in a low temperature cooling water state, and is ready to be again used in cooling.

In this case, hot and humid air generated after heat exchange is discharged through the cooling fan 11 of the cooling tower 10, and flows in an upward direction perpendicular to the ground surface. Farther apart from the cooling tower 10, however, the hot and humid air is most rapidly, radially dispersed at the outer rim region of the cooling fan 11 due to the gravity and other factors of the outside air flowing in the vicinity of the central region of the cooling tower 10, and consequently, a part of the radially dispersed air streams inevitably flow back into the cooling tower 10. The air guide 21 of the present invention, however, prevents the air discharged from the cooling tower 10 from flowing back into the cooling tower 10. That is, the air guide 21 allows only the substantially dry low temperature outside air to flow into the cooling tower 10.

Figure 1:
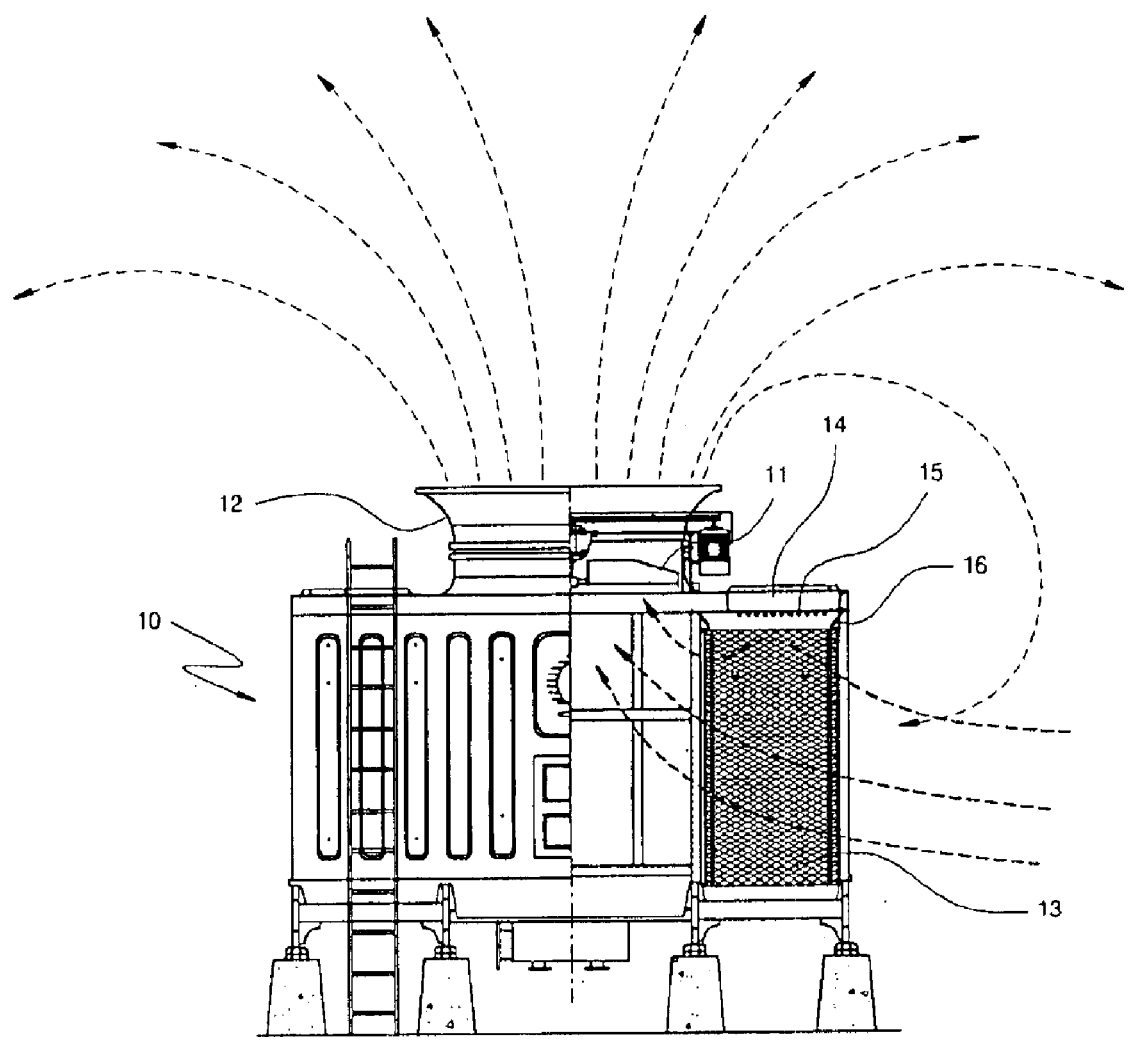
FIG. 1 is a front view illustrating a conventional cooling tower.
Figure 2:
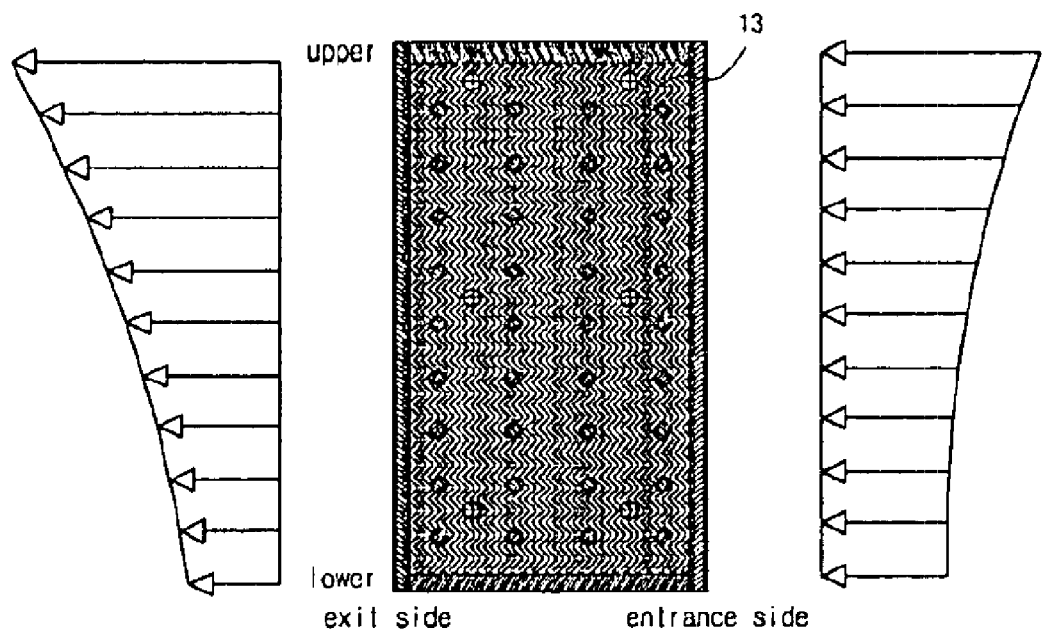
FIG. 2 is a view illustrating each air streams at the entrance and exit sides of a filler material in the conventional cooling tower.
Figure 5:
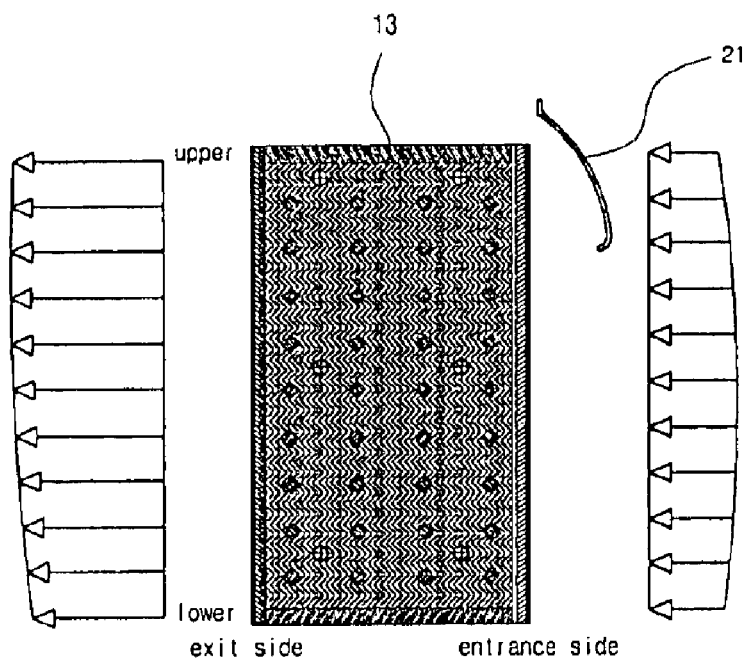
FIG. 5 is a view illustrating each air streams at the entrance and exit sides of the filler material in the cooling tower, which is provided with the air guide in accordance with an embodiment of the present invention.

Referring to FIG. 5, it can be seen how the inflow air streams into the cooling tower 10 controlled by the air guide 21 for a cooling tower in accordance with the present invention. Herein, FIGS. 2 and 5 illustrate the air streams at the entrance and exit sides of the filler material 13. Through the entrance side of the filler material 13 the outside air flows into the cooling tower 10, and through the exit side of the filler material 13 the air passed through the filler material 13 is discharged to the central region of the cooling tower 10. Referring to FIG. 2 illustrating the air streams flowing into and discharging from the filler material 13 in the conventional cooling tower 10, it can be seen that there is a large deviation between the amounts of the air at the upper and lower sides of the filler material 13. In the case of the cooling tower provided with the air guide 21 in accordance with the present invention, however, it can be seen from FIG. 5 that the air streams evenly flow into and are evenly discharged from the filler material 13 throughout the vertical length thereof.

The air guide 21 provided at the cooling tower 10 further functions to prevent direct sunlight to be irradiated onto the side of the filler material 13 exposed to the outside, thereby preventing the filler material 13 from being rapidly deteriorated by ultraviolet rays. The air guide 21 furthermore prevents invasion of any exterior impurities e.g., earth, sand, rainwater, and the like into the cooling tower 10.

Meanwhile, the inflow of the substantially dry low temperature outside air into the cooling tower 10 is controlled by the extension portion 22 formed at the lower end of the air guide 21, more particularly at the lower ends of the air-inflow interception wall and the lateral barriers.

Considering the circulation of the air into the cooling tower 10, since the air initially flows along the extension portion 22 before being introduced into the cooling tower 10, and the extension portion 22 of the air guide 21 allows the inflow air to evenly flow along the overall region of the filler material 13, no stagnant air streams occur. Conventionally, such stagnant air stream occurs as a part of inflow air seceded from the upper side of the filler material 13.

Figure 6:
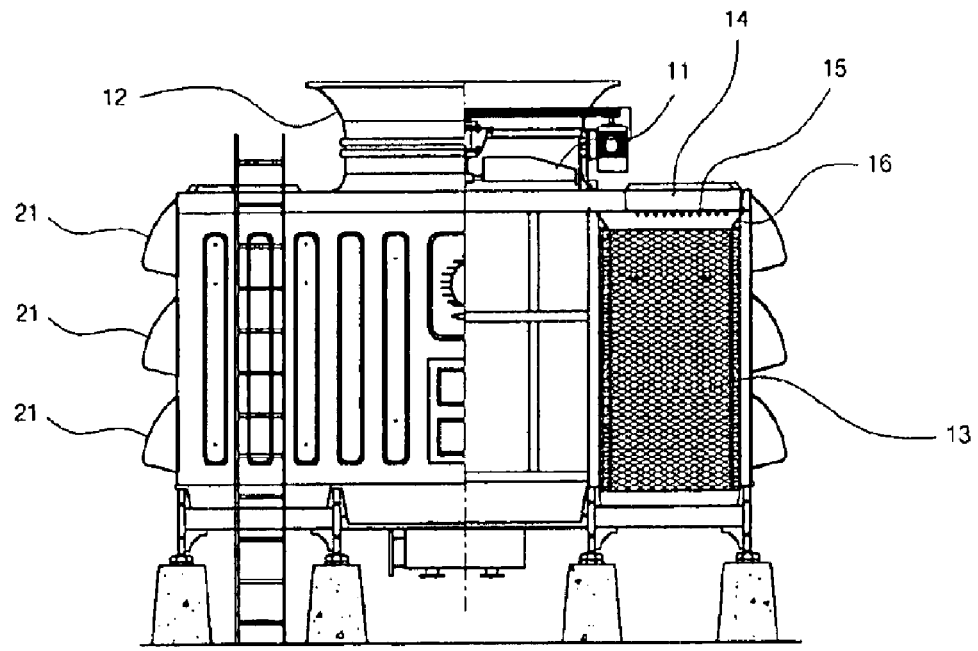
FIG. 6 is a front view illustrating the cooling tower provided with the air guide in accordance with other embodiment of the present invention.

In another embodiment of the present invention, a plurality of the air guides 21 may be coupled to the sides of the cooling tower 10 in multiple layers. That is, as shown in FIG. 6, the plurality of the air guides 21 having similar shapes and sizes are coupled to the sides of the cooling tower 10 at constant vertical distances, thereby serving to control the air streams flowing into the cooling tower 10, and to protect the filler material 13 from direct sunlight, exterior impurities, and the like.

Figure 7:
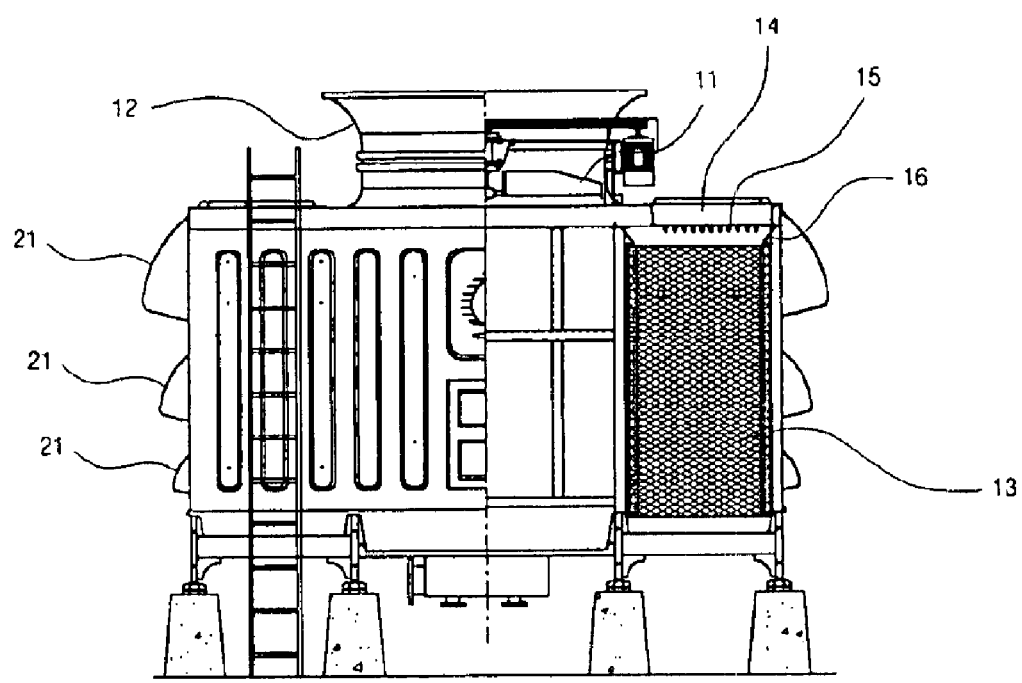
FIG. 7 is a front view illustrating the cooling tower provided with the air guide in accordance with another embodiment of the present invention.

In yet another embodiment of the present invention as shown in FIG. 7, the air guides 21 coupled to the sides of the cooling tower 10 and arranged in a vertical direction of the cooling tower 10 are determined so as to be reduced downward in width and height thereof. Such a configuration is more effective to prevent a reduction in the amount of the air flowing into the cooling tower 10, and to completely prevent the invasion of any exterior impurities into the cooling tower.

As apparent from the above description, an air guide for a cooling tower in accordance with embodiments of the present invention exhibits various effects.

One effect may be that the air guide can prevent hot and humid air discharged through a cooling fan of the cooling tower to the outside from flowing back into the cooling tower, thereby allowing only substantially dry low temperature outside air to flow into the cooling tower, resulting in an improvement in cooling efficiency of the cooling tower.

Another effect may be that the air guide enables the air introduced into the filler material to evenly pass through the overall region of the filler material without generating stagnant air streams on a partial region of the filler material or without causing secession of air streams out of the filler material, resulting in an improvement in heat exchange efficiency of the cooling tower.

Another effect may be that by virtue of the fact that a plurality of the air guides are coupled to left and right out side air-inflow lateral regions of the cooling tower and are arranged in a vertical direction of the cooling tower, it is possible to prevent direct sunlight to be irradiated onto the filler material, thereby preventing a deteriorative performance of the filler material caused by ultraviolet rays, and consequently protecting the filler materirl from any exterior impurities or rainwater.

An improved has been disclosed, it is to be understood that these embodiments are for illustration purpose and not limiting. Many additional modifications, additions and substitutions will be apparent to persons of ordinary skill in the art reading this disclosure. Thus, the present invention is limited only by the following claims.

What is claimed is:

1. An air guide device for a cooling tower, comprising:
   at least one air guide being coupled to a side surface of the cooling tower, and having a length corresponding to a width of the side surface,
   wherein the air guide includes:
   an air-inflow prevention wall having a curved cross section extending downwardly and outwardly, and adapted to prevent air discharged from the cooling tower from flowing back thereinto;
   an air inlet portion being defined at a lower end of the air-inflow prevention wall and adapted to allow inflow of outside air into the cooling tower; and
   an extension portion extending from the lower end of the air-inflow prevention wall toward the cooling tower.

2. The device of claim 1, wherein a plurality of air guides is arranged in a vertical direction of the cooling tower.

3. The device of claim 2, a lower air guide of the plurality is smaller in width and height than an upper air guide of the plurality.

4. The device of claim 2, wherein the plurality of air guides is arranged in multiple layers.

5. An air guide device for a cooling tower, comprising:
   a plurality of air guides being coupled to a side surface of the cooling tower in a vertical manner, and having a length corresponding to a width of the side surface,
   wherein each of the air guide includes:
   an air-inflow prevention wall having a curved cross section extending downwardly and outwardly, and adapted to prevent air discharged from the cooling tower from flowing back thereinto;
   an air inlet portion being defined at a lower end of the air-inflow prevention wall and adapted to allow inflow of outside air into the cooling tower; and
   wherein a lower air guide of the plurality is smaller in width and height than an upper air guide of the plurality.

* * * * *